(12) United States Patent
Yuen

(10) Patent No.: US 6,225,789 B1
(45) Date of Patent: May 1, 2001

(54) BATTERY CHARGER

(75) Inventor: Tang Kong Yuen, Singapore (SG)

(73) Assignee: SGS-Thomson Microelectronics Pte Ltd (GB)

( * ) Notice: Subject to any disclaimer, the term of this patent is extended or adjusted under 35 U.S.C. 154(b) by 0 days.

(21) Appl. No.: 09/563,131

(22) Filed: May 2, 2000

Related U.S. Application Data

(62) Division of application No. 08/190,943, filed on Feb. 3, 1994.

(30) Foreign Application Priority Data

| May 5, 1993 | (GB) | 9309174 |
| May 5, 1993 | (GB) | 9309177 |

(51) Int. Cl.[7] .................................................. H02J 7/04
(52) U.S. Cl. ........................................ 320/162; 320/137
(58) Field of Search .................................... 320/162, 137, 320/161, 131; 324/433; 340/455, 636

(56) References Cited

U.S. PATENT DOCUMENTS 5,432,426 * 7/1995 Yoshida ............................... 320/160

* cited by examiner

Primary Examiner—Peter S. Wong
Assistant Examiner—Lawrence Luk
(74) Attorney, Agent, or Firm—Daniel E. Venglarik

(57) ABSTRACT

An end-of-charge detection technique for a battery charger is described. The technique involves the detection of a voltage drop at the end of charging and eliminates the effect of noise spikes.

5 Claims, 9 Drawing Sheets

BATTERY CHARGER

This application is a division of U.S. Ser. No. 08/190,943 filed Feb. 3, 1994.

FIELD OF THE INVENTION

The present invention relates to a battery charger, and particularly to an end of charge detection technique for use in a battery charger.

BACKGROUND TO THE INVENTION

Charging characteristics for nickel cadmium (NICD) batteries are shown in curve b of FIG. 5. The battery voltage increases slowly for 90% of the battery capacity during charging, but then starts to climb steeply after that, from point P1 onwards. At point P3 the voltage levels off and starts to decline from point P3 to point P4. It is known to attempt to determine the end of charge point by detecting this voltage drop (–dV) at the end of charging.

Due to increasing usage of ultra-fast or fast charging rates (one hour or less than one hour charging time) in present day high end chargers, switch mode power supply technology is employed for the design of chargers due to reasons of size and efficiency. However, these designs have high switching noise.

These switching noises can take the form as shown in FIG. 8a. They can be spikes or glitches S on an otherwise calm and slowly changing battery voltage level $V_{batt}$. False detection by a conventional charger monitor using a –dV method can occur in cases like that depicted in FIGS. 8b and 8c. In FIG. 8b, a noise spike S reaches a voltage level v1. If one voltage measurement is made at v1 and another at v2, a –dV detection will be indicated if the measurement at v2 is lower than that at v1 by more than the present threshold, e.g. 50 mV. The same false detection will occur if, as in FIG. 8c, the measurement at noise spike v4 is lower than that at v3 by more than the same threshold value (FIG. 8c).

Due to the fact that amplitudes of switching noises 5 are generally in the range of hundreds of mV, whereas the detection threshold of –dV detection is only tens of mV, to avoid false detection due to these noise signals, extensive filtering has to be used. Very often, too much filtering causes a slow response and the result is that the battery is overcharged before the –dV point is detected and charging terminated. The avoidance of noise by filtering is also very dependent on the particular design of charger. Optimum filtering for one charger may be insufficient for another. It also increases the cost of implementation.

Another known method to avoid false detection in –dV detection techniques is to interrupt charging and to measure the battery voltage before resuming charging. This is done because during the interval when charging is stopped, switching noises are minimal and it is thus an optimum time to take a measurement of battery voltage. The drawback of this approach is that charging times are considerably longer due to the interruptions and also delays are caused due to the waiting times during voltage measurements. The waiting times are necessary for the battery voltage to settle down just after charge interruptions to ensure accurate readings.

The aim of the present invention is to enable the –dV point to be detected accurately at the end of charge when charging on an NICD battery in a noisy environment.

SUMMARY OF THE INVENTION

According to the present invention there is provided a battery charging including:

a voltage detection circuit for monitoring the voltage of a battery being charged and for providing sequentially a plurality of voltage values;

a comparator connected to compare each voltage value with the preceding voltage value thereby to determine when there is a difference exceeding a threshold value; and a detector arranged to output an end of charge detection signal when said difference has been determined and when the last preceding voltage value has not exceeded the last but one preceding value.

Preferably, a further voltage value is generated after the voltage value at which said difference is determined, said further voltage value being compared with the last voltage value.

By taking measurements before the moment when a voltage drop is suspected and also taking measurements after that moment, it is possible to eliminate the effect of switching noises and only act on a genuine voltage drop.

The voltage detection circuit can be enabled in response to a signal from a pre-measurement circuit which identifies the time when a voltage drop is suspected. This pre-measurement circuit can take the form of a dV/dt circuit (voltage gradient measurement) or a dT/dt circuit (temperature gradient measurement) as described herein.

The present invention also provides a method of detecting a voltage drop when charging a battery, the method including monitoring the voltage of a battery being charged and providing sequentially a plurality of voltage values; comparing each voltage value with a preceding voltage value thereby to determine when there is a difference exceeding a theshold value; and producing an end of charge detection signal when said difference has been determined and when the last preceding voltage value has not exceeded the last but one preceding value.

For a better understanding of the present invention and to show how the same may be carried into effect, reference will now be made by way of example to the accompanying drawings.

DESCRIPTION OF THE PREFERRED EMBODIMENT

There follows a description of a low cost, reliable, efficient and accurate battery charger for Ultra-fast or Fast charging (one hour or sub-hour charging time) of NICD or NIMH batteries. The detection concepts include universal end-of-charge detection when charging NICD and/or NIMH batteries without the need to indicate which kind of battery is being used by the user; simple, low cost but accurate way of implementing negative delta-V detection (with which the present invention is principally concerned); and a whole series of charge termination techniques to ensure fast but safe battery charging.

Figure 1:
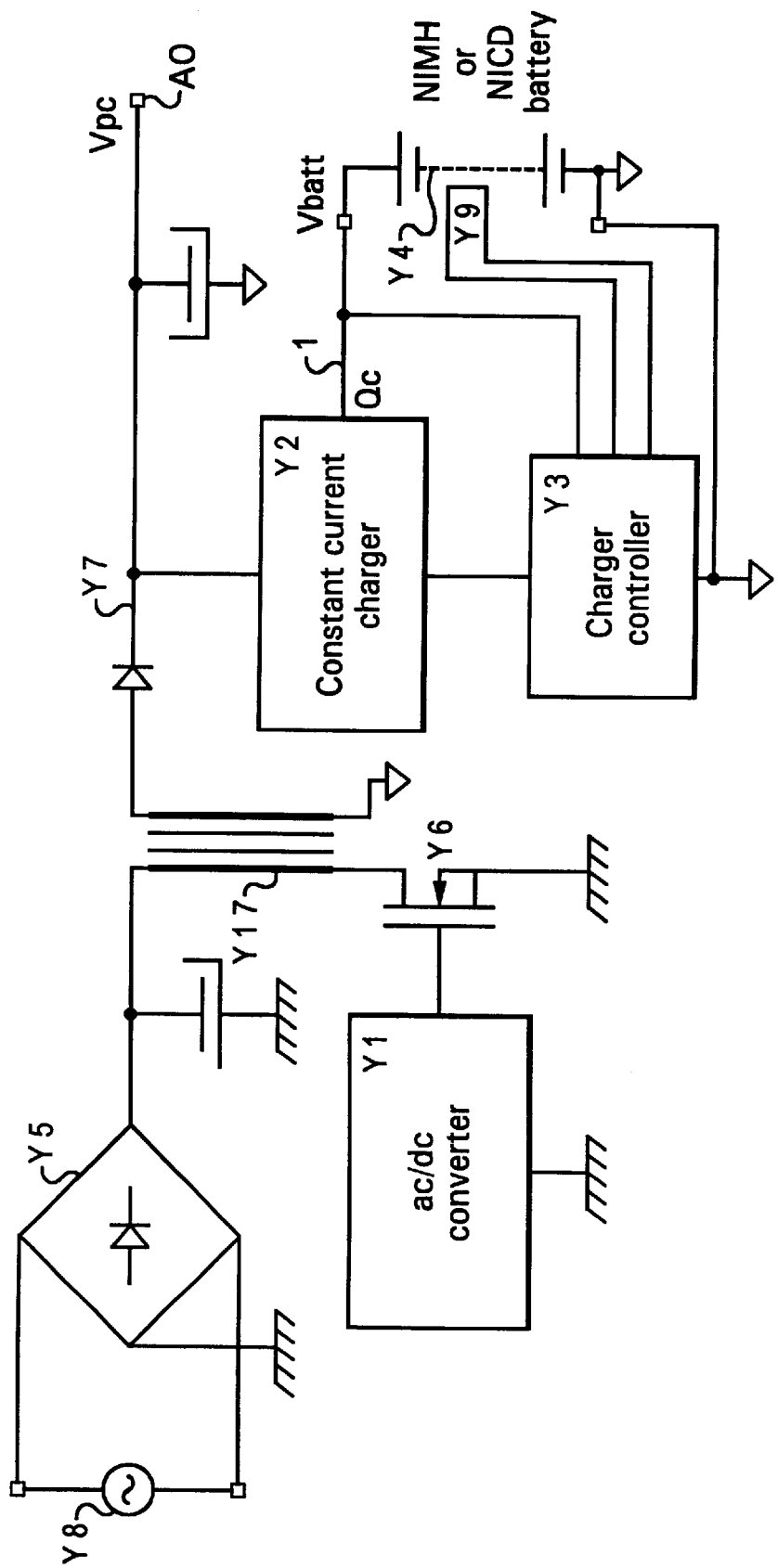
FIG. 1 is a block diagram of a battery charging system.

FIG. 1 illustrates a battery charger controller Y3 in use with an ac/dc converter Y1, a constant current charger circuit Y2 and a NICD or NIMH battery pack Y4 to realise a basic fast (one hour or less) battery charger.

The ac/dc converter Y1 is connected via a switching element in the form of a transistor Y6 to the primary side of a transformer Y17. The primary side of the transformer Y17 is connected to the output of a bridge rectifier Y5 across which is connected an ac power supply Y8 having a range of between 90 to 270 V. The ac/dc converter Y1 converts AC power from the supply Y8 to DC power on line Y7 on the secondary side of the transformer Y17 through the bridge rectifier Y5 and the switching element Y6. Power line Y7, in addition to supplying power to a portable computer through an auxiliary output AO, also supplies power for battery charging through the constant current charger circuit Y2. The constant current charger circuit is a power converter which provides a constant current through its output Qc to charge the battery pack Y4. A relatively constant current is needed for charging the battery if a voltage drop (−dV) method of end-of-charge detection is to be used, as any variation in the voltage level during charging must then be due to the capacity of the battery. Reference Y9 denotes a thermistor which can be supplied with the battery pack Y4 for reasons explained hereinafter.

Figure 2A:
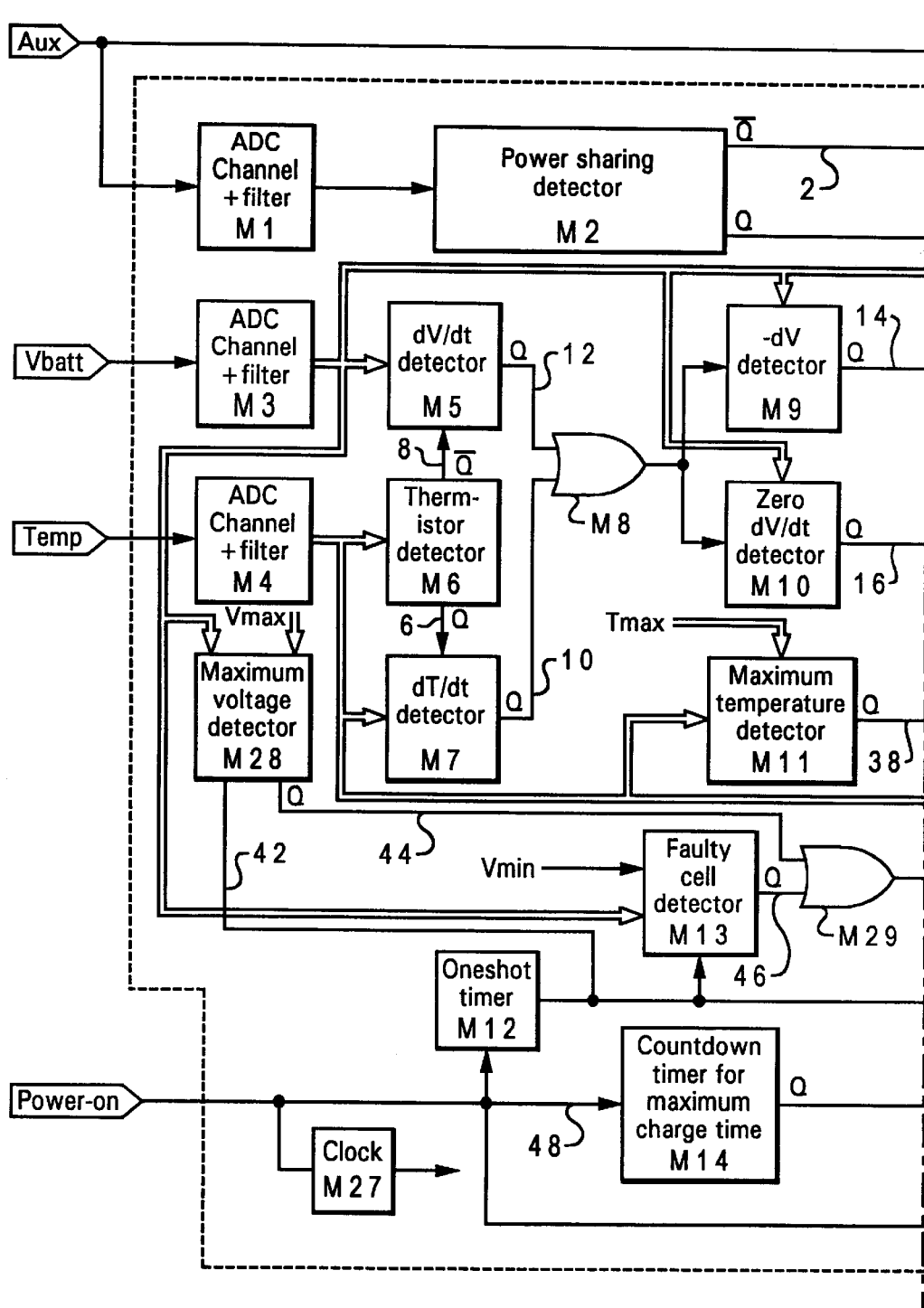
FIG. 2 is a circuit diagram of a battery charger controller.
Figure 2B:
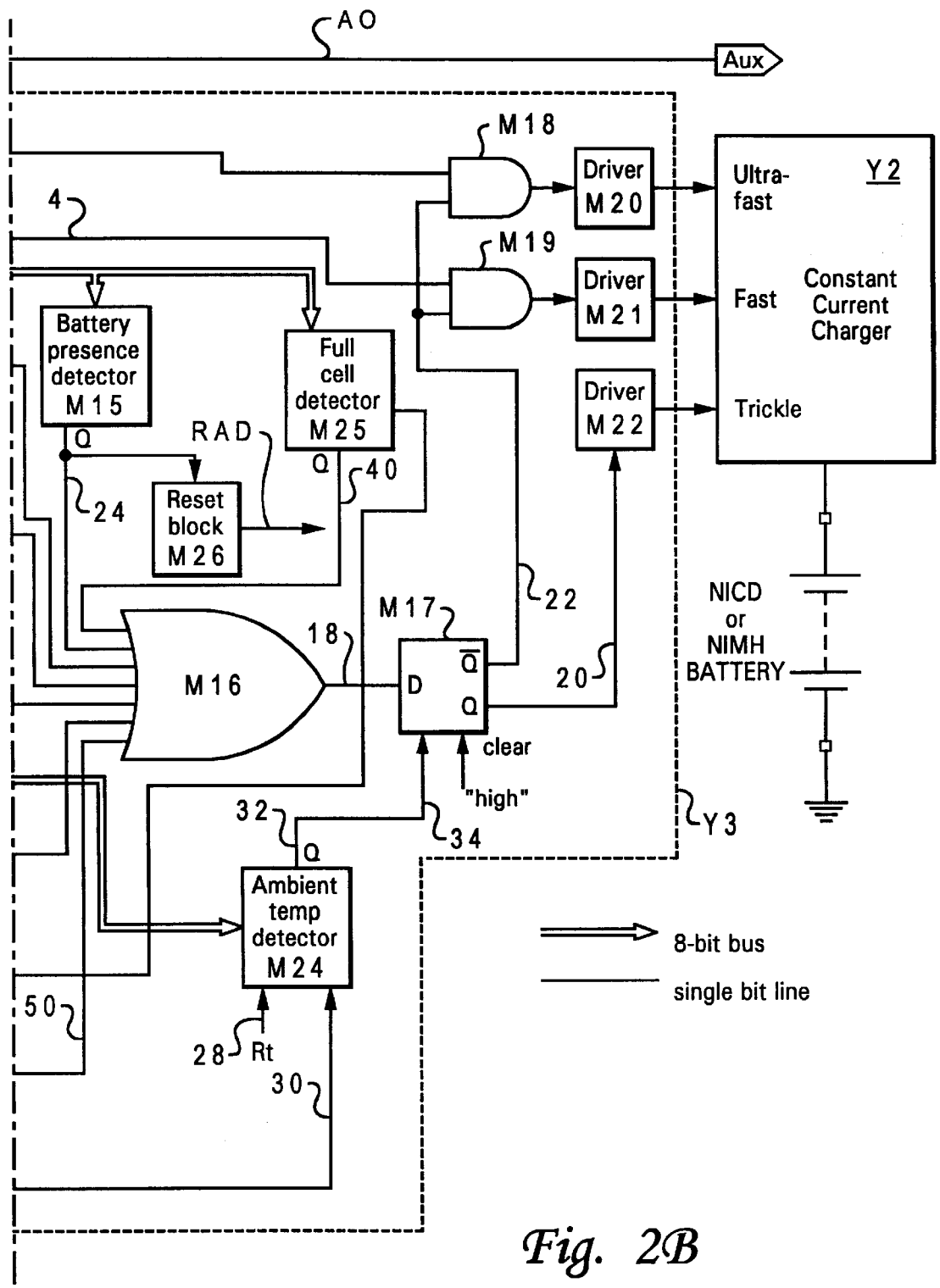

FIG. 2 illustrates the composition of the battery charger controller Y3 (within the dotted boundary). In FIG. 2, the thick black lines denote on 8 bit bus and the thin line denotes a single bit line. Inputs for the charger controller Y3 include a voltage on the auxiliary output AO (terminal AUX), a battery voltage (terminal $V_{batt}$), a cell temperature signal (terminal Temp) and a power-on signal (terminal Power-on). Outputs from the charger controller Y3 are supplied by drivers M20,M21 and M22 to implement ultra-fast charging, fast charging or trickle charging respectively at the external charger circuit Y2.

Upon power-up, a power sharing detector M2 implements ultra-fast charging. This is done by appropriate signals from the $\overline{Q}$ outputs 2,4 of the power sharing detector M2, through gates M18 and M19, which control the drivers M20 and M21. The gate M18 has one input connected to the $\overline{Q}$ output 2 of the power sharing detector M2 and its other input connected to the $\overline{Q}$ output 22 of a flip-flop M17 which will be described later. The gate M19 has one input connected to the Q output 4 of the power sharing detector M2 and its other input connected to the $\overline{Q}$ output 22 of the flip-flop M17. If the computer is off, charging will be in the ultra-fast mode. Actual implementation of the charging rate is by the external charger circuit Y2, controlled by the drivers M20,M21 and M22. A detailed description of the power sharing detector device M2, including how measurements and decisions are made, is given in our copending Application No. (Page White & Farrer Ref. 73682), the contents of which are herein incorporated by reference.

The cell temperature read from thermistor Y9 (FIG. 1), is supplied to the Temp terminal, and fed through an ADC channel plus filter M4 into a thermistor detector circuit M6. In the case that the thermistor Y9 is used in the battery pack Y4 and connected to the charger controller, a dT/dt detector M7 is enabled by the Q output 6 of the thermistor detector M6. If a thermistor is not used, a dV/dt detector M5 is enabled by the $\overline{Q}$ output 8 of the thermistor detector M6.

If the dT/dt detector M7 is enabled, the rate of change of the cell temperature is measured. If this rate exceeds a certain limit, a dT/dt flag will be set, indicating a fast rising cell temperature, which is normally the case just before the end-of-charge of the battery. The setting of the dT/dt flag will be indicated by a "high" level at the Q output 10 of the dT/dt detector of the block M7.

If the dV/dt detector M5 is enabled, the rate of change of the battery voltage is measured. If it is found to be rising at or above a predetermined rate, a dV/dt flag will be set. This is also an indication that end of charge is approaching as normally, near to the end-of-charge point (90% capacity point), the battery voltage rises steeply before levelling off at its peak and later dips (in the case of an NICD battery) or flattens out (in the case of an NIMH battery).

Whether the dV/dt or the dT/dt flag is set, both a −dV detector M9 and a zero dV/dt detector M10 will be enabled by the Q outputs 12,10 from the dV/dt and dT/dt detectors M5 and M7 through a gate M8. At the −dV detector M9 any voltages drop after the setting of the dT/dt or dV/dt flag will be detected and verified. Confirmation of a true voltage drop detection will be indicated by setting a −dV flag putting a "high" level at the Q output 14 of the −dV detector M9. Detailed explanation of the −dV detector follows later.

Simultaneously, the zero dV/dt detector M10 measures the slope of the battery voltage until a flat slope is detected within a certain time frame. This flat slope indicates that the peak voltage of the battery has been reached and can be used as an end-of-charge indication, particularly for an NIMH battery which may not exhibit any pronounced voltage dip in its fully charged state. Its Q output 16 is set high in this state.

Since the −dV and zero dV/dt detectors M9,M10 operate simultaneously, either a voltage dip or a flat slope may be detected to indicate end-of-charge, depending on which detection is first detected. Thus both NICD and NIMH batteries can be charged by the same system without the need to tell the system which kind of battery is being used.

Setting of the −dV flag or the zero dV/dt flag, indicated by a "high" at the Q output 14 of M9 or 16 of M10, will set the flip-flop M17 through a gate M16. Once M17 is set by a "high" at its D input 18, its Q output 20 will go "high" to enable trickle charging and its $\overline{Q}$ output 22 will go "low", disabling ultra-fast or fast charging through the gates M18, M19 connected to the drivers M20,M21.

The circuits M3,M4,M5,M6,M7,M8,M9 and M10 constitute a battery charger monitor BCM which is described in more detail with reference to FIG. 4.

The flip-flop M17 can also be set by other circuits besides M9 and M10, as described in the following.

A battery presence detector M15, connected to sample the battery voltage at terminal $V_{batt}$ through the ADC channel and filter M3, can determine whether a battery is present at the $V_{batt}$ terminal or not. This is because the Q output 1 of the constant current charger Y2 in FIG. 1 assumes a preset voltage value when the battery Y4 is not connected, which is distinctively higher than the maximum voltage that the battery can go in its fully charged state. Thus if the battery presence detector M15 detects a value nearer to the preset output level of the constant current charger Y2 it will interpret that the battery is not present and set the flip-flop M17 through the gate M16, by having a "high" level at is Q output 24.

However, if a battery is subsequently reconnected to the battery terminal, the battery presence detector M15 will detect its presence and reset its Q output 24 to a "low" level. This negative going transition will trigger a reset circuit M26 to reset all detectors in the battery charger controller Y3 by a signal RAD at its output for a fresh detection cycle. This enables new packs of batteries to be charged upon replacement without the need for power reset.

The flip-flop M17 is normally reset to enable ultra-fast or fast charging, enabling drivers M20 and M21 and disabling drive M22 upon power-up, provided the ambient temperature in the battery pack Y4 before the start of charging falls within a temperature window. This temperature window is set by a range defined by a lowest and highest value, for example, 0° C. and 40° C. respectively. The reason is that if the ambient temperature around the battery pack Y4 is outside this range, it is not advisable to have ultra-fast or fast charging of the battery due to charge efficiency and safety reasons. This ambient temperature comparison is done by an ambient temperature detector M24 receiving the temperature range Rt at its input 28. The detector M24 is enabled on power-up by a signal at its enable input 30. If the temperature is within range, the detector M24 will output on its Q output 32 a "high" signal to a set pin 34 of the flip-flop M17. After this the Q and $\overline{Q}$ outputs 20,22 of M17 will be determined by the states of any one of eight detection circuits M9,M10,M11,M13,M14,M15,M25 or M28, that is a "high" signal from the outputs of any one of these circuits will inhibit ultra-fast or fast charging and enable trickle charging.

Detection circuits M9,M10 and M15 have been described above. M11 denotes a maximum temperature detector which samples the digital form of the cell temperature during charging from the Temp input via the ADC channel and filter M4. The maximum temperature detector M11 will set a Temp flat at its Q output 38 if its input exceeds a certain maximum value Tmax set internally. This maximum value Tmax could be in the range of 50 to 60° C. Above this temperature (by 1° C. or more) it is not advisable to charge the battery using a high current due to charge efficiency and safety reasons. The setting of the Temp flag on line 38 will set the flip-flop M17 thereby switching the charging rate to the trickle mode.

During the initial 3 to 5 minutes of the charging cycle, the rate of change of the battery voltage at terminal $V_{batt}$ is monitored by a full cell detector circuit M25. Since for an already charged battery its voltage rises rapidly for the first few minutes of recharging, this occurrence can be detected by the circuit M25 to indicate a "full" battery. Thus a "high" signal is generated at its Q output 40 which sets the flip-flop M17 via the gate M16. The time frame used to set the initial period for this "full" cell detection is generated by a one-shot timer M12 which is triggered by the Power-on signal from the Power-on terminal.

There is also a maximum voltage detector M28 which measures the battery voltage during the initial few minutes of the charging cycle and cuts off charging if its value exceed a maximum voltage reference $V_{max}$, as the battery is most likely a "full" one. This is done by its Q output 44 going high and being supplied to the gate M16 via a gate M29. The time frame used for this detection is also taken from the one-shot timer M12, connected to the enable input 42 of the maximum voltage detector M28. By detecting fully charged batteries during the initial portion of the charge cycle by detectors M25 and M28, unnecessary charging can be avoided and also the battery is better protected against overcharging.

During the same time frame set by the one-shot timer M12 as mentioned above, a faulty cell detector M13 also operates. After this preset time frame during which ultra-fast or fast charging is in progress, the detector M13 will measure the battery voltage and if it is below a certain minimum level $V_{min}$, its Q output 46 goes "high" and the flip-flip M17 is set.

Finally, there is a count-down timer M14 which starts counting down after receiving the power-on signal at its input 48 and sets the flip-flop M17 via its Q output 50 through gate M16 when its content is decremented to zero. Both this timer M14 and the maximum temperature detector M11 are important to terminate charging in cases when the main detection methods (dV/dt M5, dT/dt M7, −dV M9 and zero dV/dt M10) fail, so as to ensure the survival of the battery pack at the high charging current.

M27 denotes a clock circuit which generates clock signals for each charging cycle. All readings are taken once every charge cycle.

Figure 3A:
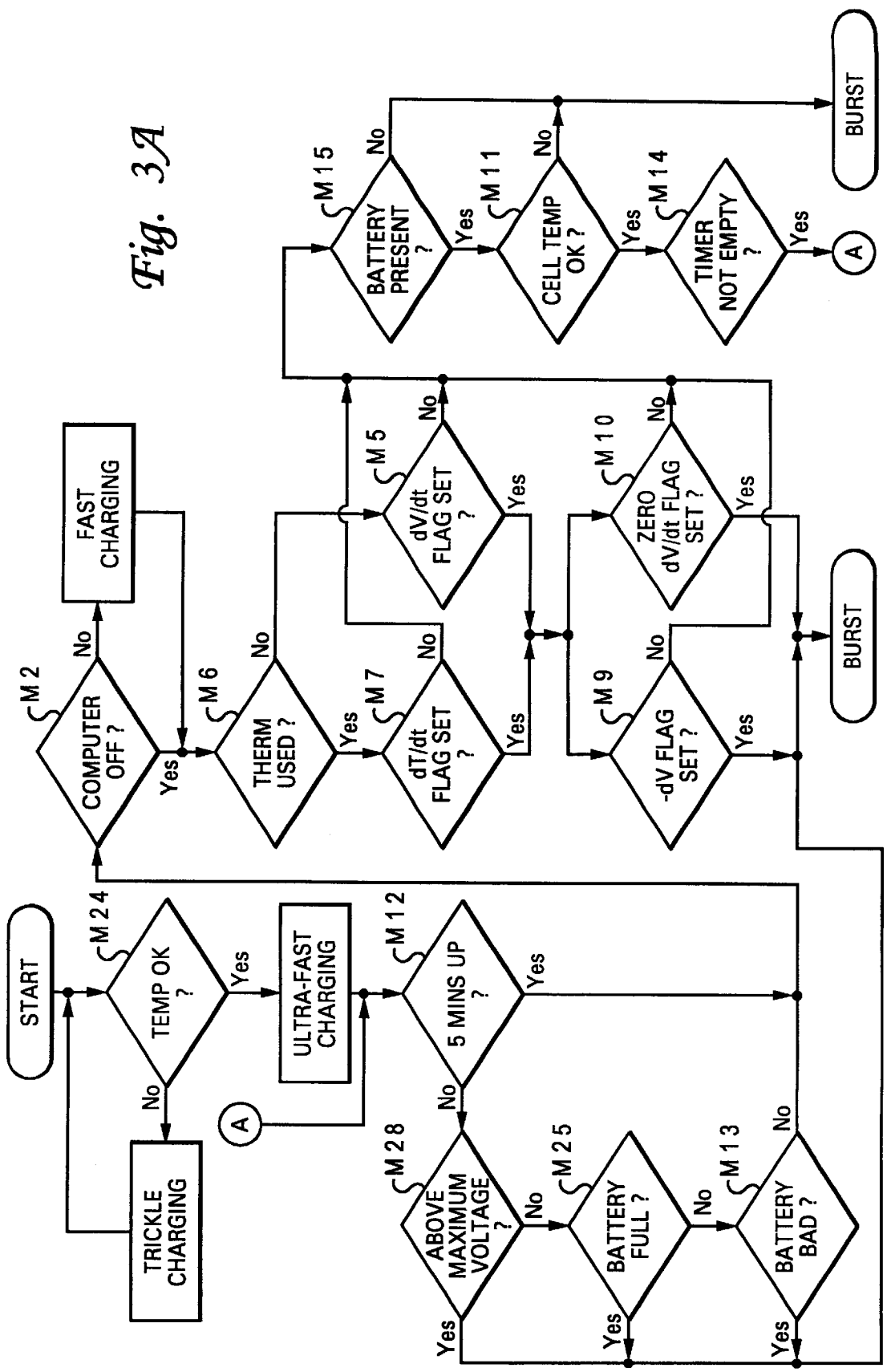
FIG. 3 is a flow chart illustrating the sequence of operation of the battery charger controller.
Figures 3B, 4B:
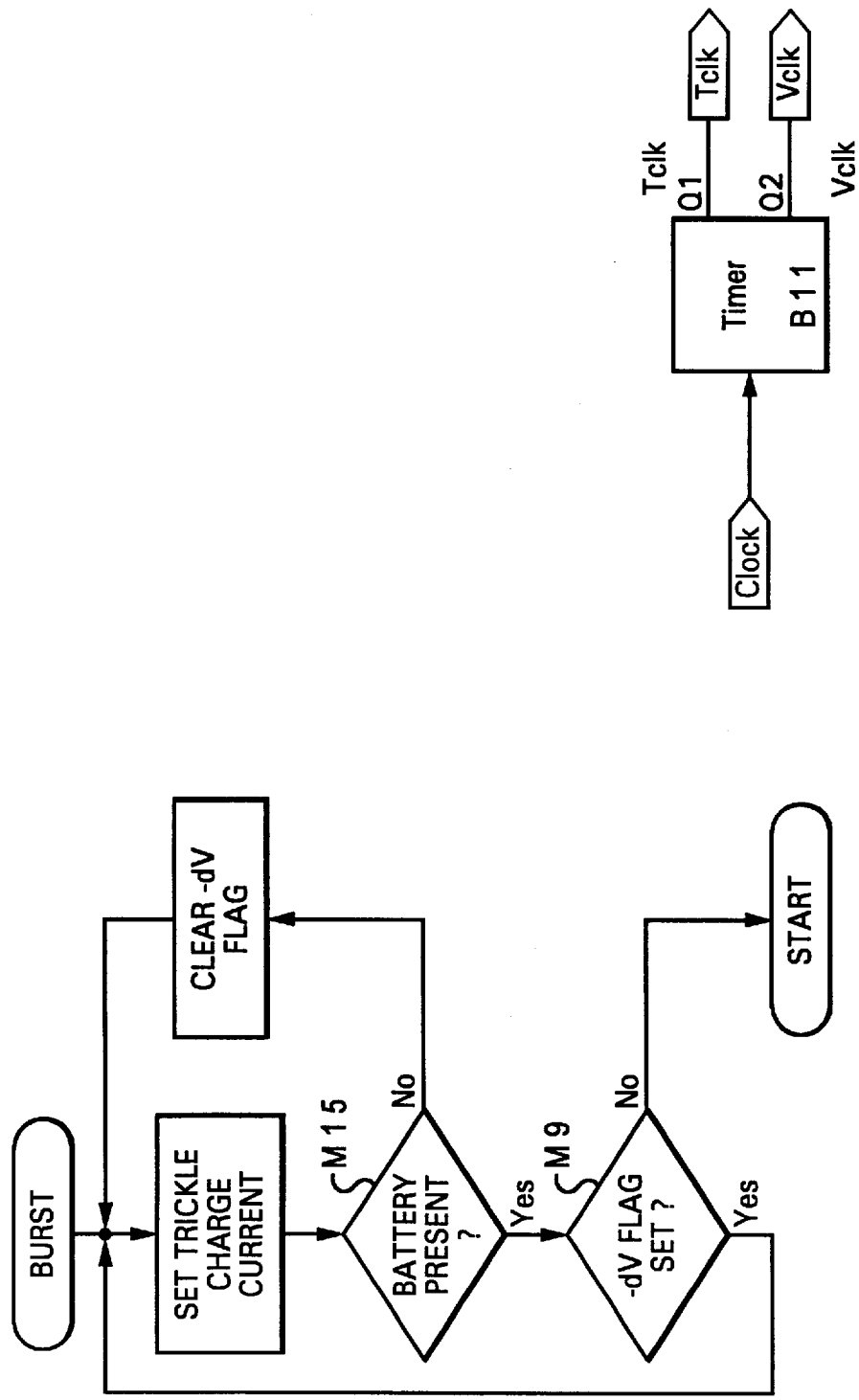
FIG. 4 is a block diagram of those components forming the battery charger monitor.

FIG. 3 is the flow chart of the operation inside the described battery charger circuit.

After power-on but before charging starts, the cell temperature is measured in the ambient temperature detector circuit M24. If it falls outside the temperature window Rt (0° C. to 40° C., as mentioned before) trickle charging M22 will take place until it falls back to within range. If cell temperature is within range, ultra-fast charging M20 will be done.

During the first few minutes of charging set by the one-shot timer M12 the battery voltage is measured by circuit M28. If it exceeds a certain level per cell, this indicates that the battery is already fully charged so that high current charging is unnecessary. Ultra-fast charging will be terminated and replaced with a trickle charge (in the "burst" mode). In addition the rate of change of battery voltage is also monitored by full cell detector M25 within the same time frame. If a certain threshold is exceeded, indicating also a "full" cell condition, ultra-fast charging is stopped, and the trickle charge "burst" mode is entered.

The battery level is also checked during the same period by M13 for faulty conditions. If the battery is found to be faulty, ultra-fast charging is stopped, and the trickle charge "burst" mode is entered. After the first few minutes determined by the one-shot timer M12, no checking will be done for maximum voltage level, faulty voltage level and "full" cell detection.

Next the computer connected to the A0 line (FIG. 1) is checked for its on/off status by the power sharing detector M2 to decide whether to continue with ultra-fast charging or switch to fast charging.

The battery is then checked for the inclusion of thermistor Y9 at block M6. If a thermistor is used, dT/dt (rate of change of cell temperature) is measured at block M7. If a thermistor is not used, dV/dt (rate of change of battery voltage) is measured at block M5. At these two blocks the dT/dt or the dV/dt is monitored for the pre-measurement phase and the respective flags set accordingly when detection occurs.

The setting of either the dT/dt or dV/dt flag completes the pre-measurement phase and opens the gate for the final end-of-charge detection at M9 (for detection of setting of −dV flag) and M10 (for detection of the setting of the zero dV/dt flag) concurrently. Setting of either the −dV flag or zero dV/dt flag will complete the end-of-charge detection, after which charging will be replaced with the "burst" mode (trickle charge).

If the battery is not near to the end-of-charge point yet, a scan time follows during which the battery presence detection (by M15), cell temperature detection (by M11) and charging time detection (by M14) are done. If the battery is removed, charging is stopped and the "burst" mode (trickle charging) takes over. In the "burst" mode, the battery contacts are continuously scanned and if a battery is reconnected, the whole charge cycle is repeated.

If cell temperature exceeds a maximum value Tmax, high current charging will be stopped and will be replaced with the "burst" mode. Similarly if the internally set timer M14 counts down to zero before any other detection is made, ultra-fast/fast charging is also stopped. Otherwise the whole charging cycle will repeat itself from point "A" until terminated by the "burst" mode.

If the "burst" mode, the trickle charge current is set, M22. The battery presence detector M15 detects if a "full" battery is removed and replaced with another pack. In that event, charging will restart from the beginning without the need for any power down and up again procedure. Otherwise, once in the "burst" mode, the charge cycle will remain in that mode until the power-on reset is applied again.

Figure 4A:
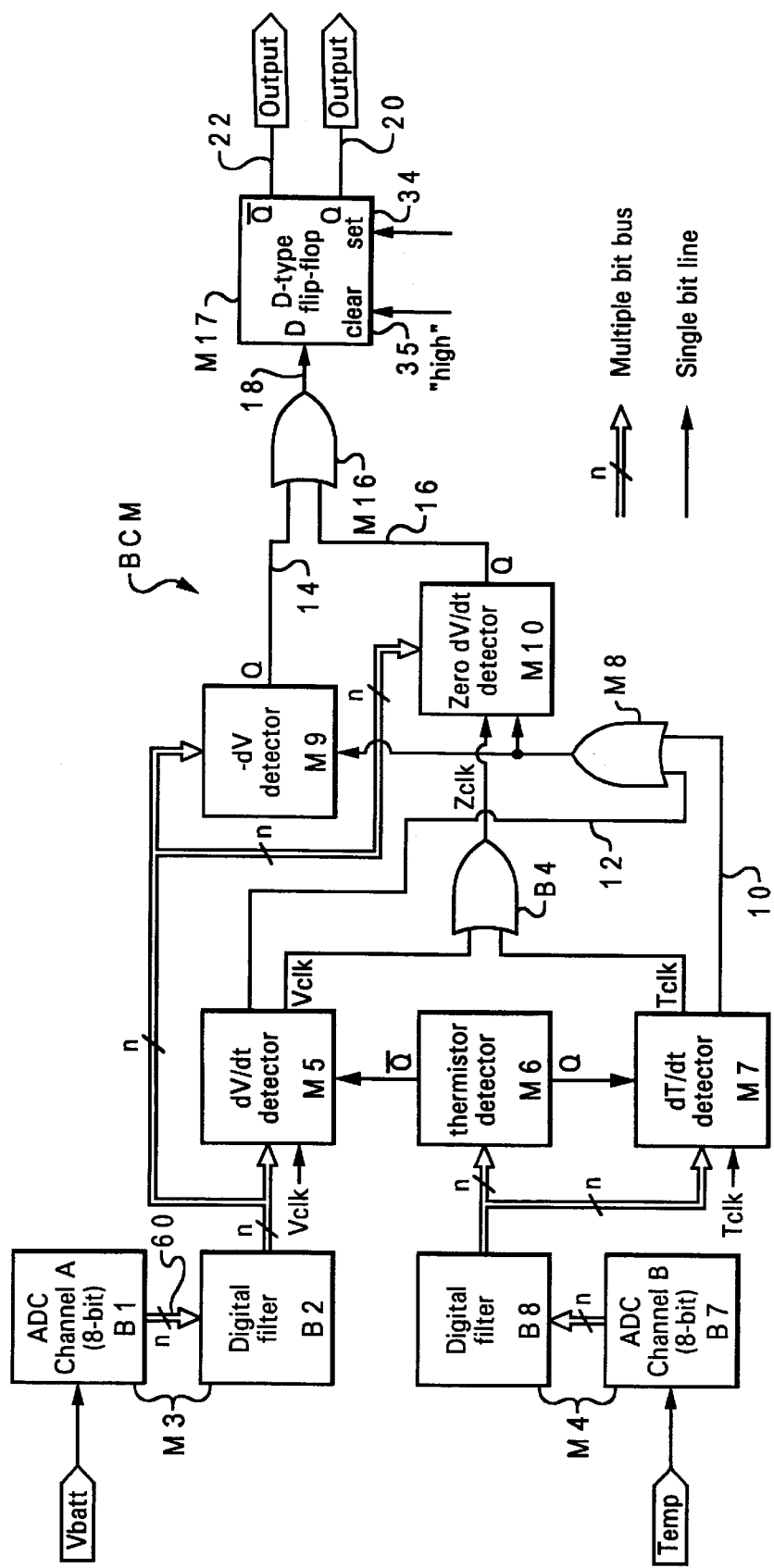

FIG. 4 is a block diagram of a battery charger monitor BCM. The battery charger monitor BCM comprises the ADC channel and filter M3 connected to the battery voltage input terminal $V_{batt}$, the ADC channel and filter M4 connected to the cell temperature input Temp, the dV/dt detector M5, the thermistor detector M6, the dT/dt detector M7, the gate M8, a further gate B4, the –dV detector M9 and the zero dV/dt detector M10. The gate M16 is shown in FIG. 4, but only two of its inputs are illustrated. The gate M16 is shown connected to the flip-flop M17. FIG. 4 also shows a timer B11 which receives a clock signal Clock from the clock M27 in FIG. 2 and produces outputs Tclk and Vclk. There now follows a more detailed description of the operation of the battery charger monitor BCM. It will be appreciated that FIG. 4 shows the ADC channels and filters M3 and M4 each as two components, namely an ADC channel B1,B7 respectively and a digital filter B2,B8 respectively.

The battery voltage is measured at the $V_{batt}$ terminal and converted from its analog form to a digital form by one channel of the analog-to-digital converter B1. The digital value is then fed into the simple digital filter B2 for filtering, through an 8-bit bus 60.

Similarly the cell temperature is measured through the Temp terminal and fed into another channel of the analog-to-digital converter B7 and filtered by the digital filter B8. The thermistor detector M6 samples the 8bit information from the filter B8 and determines whether a thermistor Y9 is being used or not. IF yes, the dT/dt detector, M7, will be enabled and the dV/dt detector, M5, disabled. If otherwise, M5 will be enabled and M7 disabled.

Figure 5:
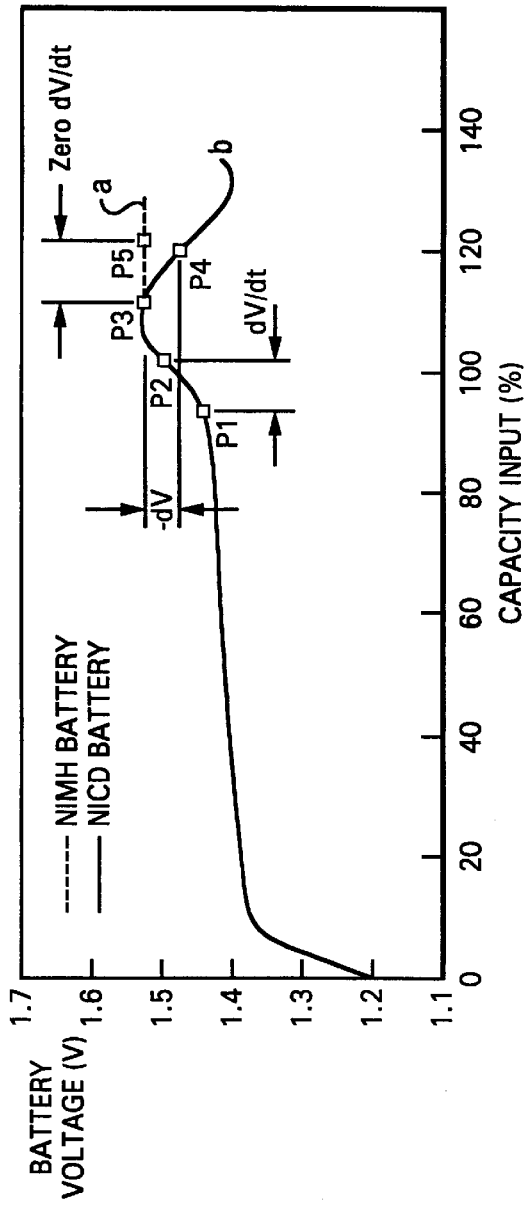
FIG. 5 is a graph of voltage against capacity indicating the characteristic of NIMH(a) and NICD(b) cells.
Figure 6:
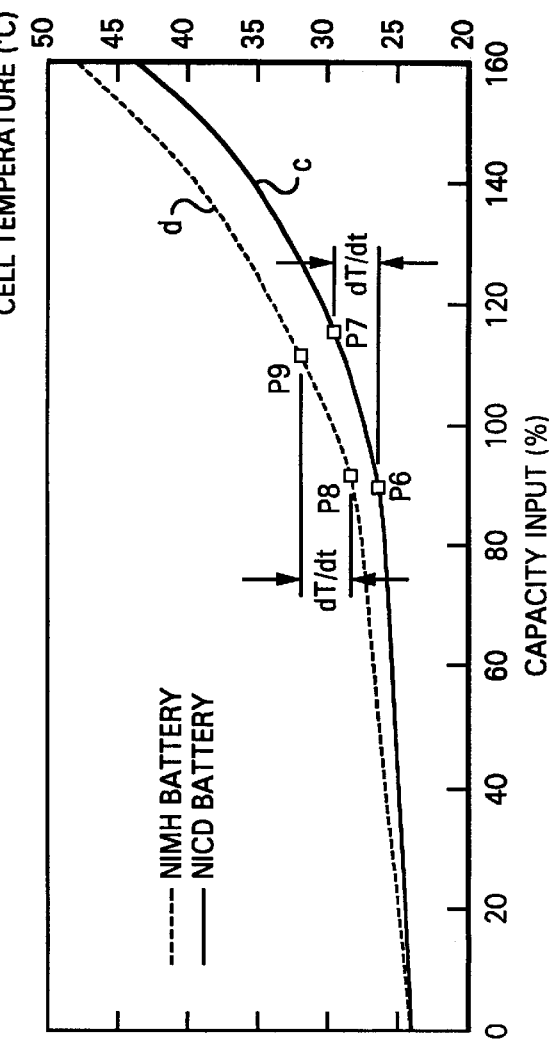
FIG. 6 is a graph of temperature against capacity indicating the characteristics of NIMH(d) and NICD(c) cells.

If the dV/dt detector M5 is enabled, it will monitor the gradient (dV/dt) of the voltage charging curve which is as illustrated in FIG. 5. As can be seen in FIG. 5, there is a substantial increase in the gradient between points P1 and P2 and this causes a dV/dt flag to be set. If the dT/dt detector M7 is enabled it will similarly monitor the gradient (dT/dt) of the temperature curve as illustrated in FIG. 6 until it detects a sharp increase in gradient, between points P6 and P7 on curve c for a NICD battery or points P8 and P9 on curve d for a NIMH battery when it will set a dT/dt flag. The gradient is monitored by making sequential measurements of voltage or temperature at interval durations (e.g. between points P1 and P2 in FIG. 5) generated by the timer B11. $T_{clk}$ sets the interval duration for dT/dt measurements and $V_{clk}$ sets the interval duration for dV/dt measurements.

When one of the dV/dt and the dT/dt flags is set, the –dV detector M9 and the zero dV/dt detector M10 are simultaneously activated, through the gate M8, enabling –dV (voltage drop) and zero dV/dt (voltage level) measurements to be taken concurrently. At this stage battery voltage measurements (through the 8-bit bus from the filter B2) are taken by the –dV detector M9 at one second intervals to monitor any negative voltage drop. Once this drop is detected (points P3 and P4, FIG. 5b) a –dV flag is set. This indicates an end-of-charge condition in an NICD battery.

At the same time the battery voltage slope is monitored between points, the interval of which is set by a clock signal $Z_{clk}$. $Z_{clk}$ is a clock signal derived from the gate B4, the inputs of which come from the dV/dt detector M5 ($V_{clk}$) or the dT/dt detector M7 ($T_{clk}$) depending on which of these circuits is enabled for pre-measurements. Once no change in voltage has been detected between points P3 and P5 in FIG. 5, the zero dV/dt flag will be set, due to a flat voltage slope in this region. This indicates an end-of-charge condition in an NIMH battery.

Once the –dV flag or the zero dV/dt flag is set, a "high" level will be available at D input 18 of the flip-flop M17 through the gate M16. This "high" level will be transferred to the Q output 20 of M17 at the next clock pulse to enable trickle charging. The $\overline{Q}$ output 22 of the flip-flop M17 will be held "low" to dissable ultra-fast or fast charging. At this point the battery pack is deemed full and only a low capacity trickle charge is required, for maintenance, to replenish self-discharging of the cells.

At start-up, the set pin 34 of the flip-flop M17 will be held "low" and the clear pin 35 held "high" (always) to disable ultra-fast or fast charging ("low" at the $\overline{Q}$ output 22 and "high" at the Q output 20) no matter what signal is available at the D input 18. Once the enable signal (a "high" level) arrives at the set pin 34, the high current charging (ultra-fast or fast mode) is activated ("high" at the $\overline{Q}$ output and "low" at the Q output) until detection is made by the –dV detector M9 or the zero dV/dt detector M10, after which trickle charging will take over.

Figure 7:
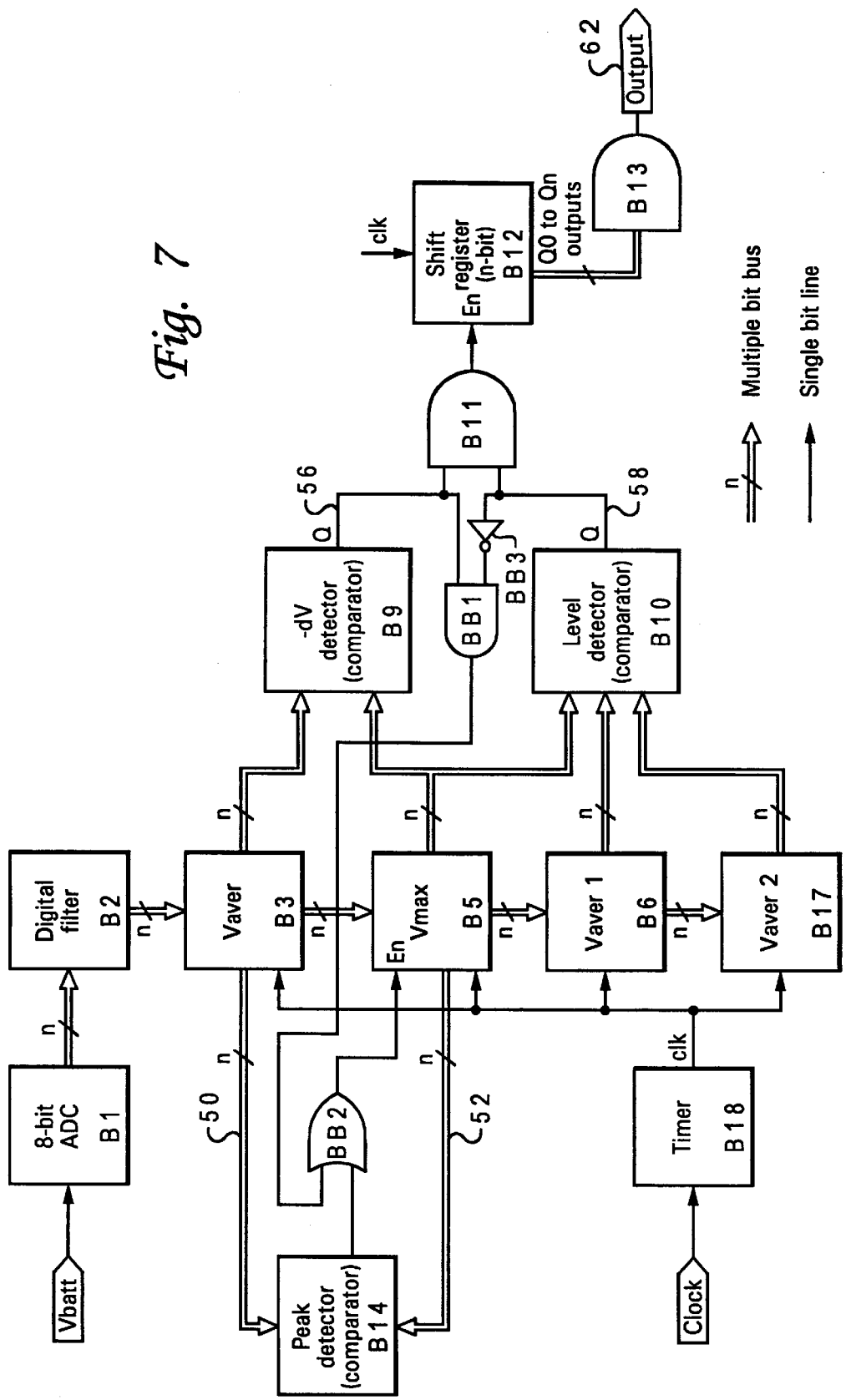
FIG. 7 is a block diagram of a negative (–dV) voltage detector.
Figure 8A:
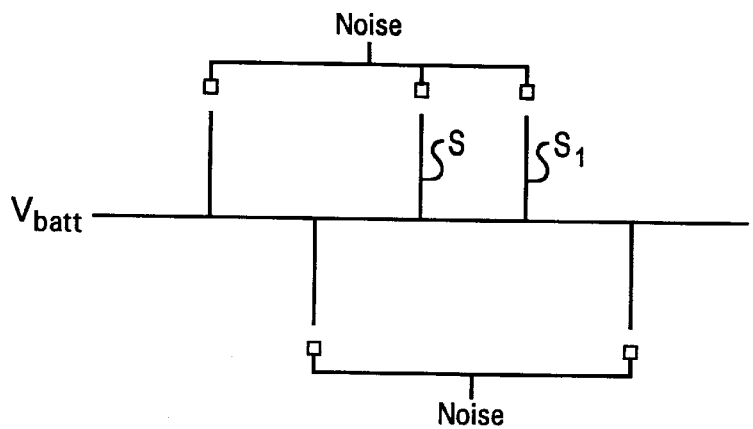
FIGS. 8a to 8c illustrate the problem that can arise when there is noise on the battery voltage.
Figure 8B:
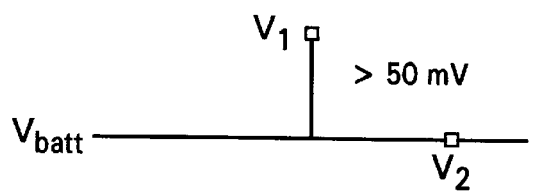
Figure 8C:
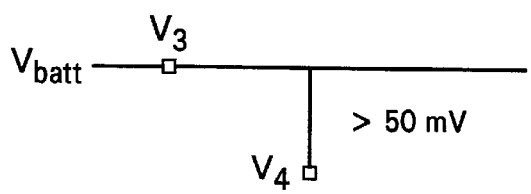

FIG. 7 is a circuit diagram for the negative (–dV) detector M9.

As described above with reference to FIG. 4, the battery voltage at terminal $V_{batt}$ is fed into the analog-to-digital converter (ADC) B1. In the ADC, the battery voltage is converted from an analog form into a digital form and fed into the digital filter B2. After filtering, the 8-bit information is then stored in a $V_{aver}$ register B3. A plurality of registers B5,B6,B17 are connected to sequentially receive filtered voltage values. The $V_{aver}$ register B3 is connected to a $V_{max}$ register B5, which is connected to $V_{aver1}$ register B6 which is connected to $V_{aver2}$ register B17.

All the registers B3,B5,B6 and B17 are clocked by a signal clk from a timer B18 which takes its input from clock M27 in FIG. 2. The signal clk has the same frequency as the measurement cycle (the frequency at which battery voltage measurements are taken). On the first clock pulse, data in the register B3 is shifted into B5, with the latest battery voltage data being stored in B3. On the next cycle, the data is clocked through so that the contents of B5 are shifted into B6, the contents of B3 into B5, etc. Thus after four cycles all the registers $V_{aver}$ (B3), $V_{max}$ (B5), $V_{aver1}$ (B6) and $V_{aver2}$ (B17) should have data in them.

B14 is a peak voltage detector which continuously compares the data from register B3 at input 50 with that form register B5 at input 52. While input 50 is greater than or equal to input 52 an enable signal is fed to register B5 so that the higher value (content of register B3) will be loaded into register B5 at the next clock cycle. Otherwise, the enable signal from peak detector B14 will not be active and the content of register B5 will not be changed at the next cycle. Thus the $V_{max}$ register B5 always contains the highest voltage level on record among all the registers.

A −dV detector B9 compares the contents of register B3, which is the newest being read in, with that form register B5 which holds the highest value. Once the content in register B3 is lower than that in register B5 by a predetermined value (e.g. 50 mV) and is detected by −dV detector B9, its Q output 56 will go "high".

Registers B6 and B17 contain the previous voltage data prior to the detection of the voltage drop. Their data is fed together with that from register B5 into a level detector B10. Only when all three data inputs are equal will the Q output 58 of level detector B10 go "high".

When both Q outputs from −dV detector B9 and level detector B10 are "high", detected by a gate B11, a n-bit shift register B12 is enabled. A "high" signal will be transferred to its $Q_0$ pin at the next clock pulse. This "high" signal will be transferred to the Q1 pin and the signal at the input of shift register B12 transferred to the $Q_0$ pin by a further clock pulse. Thus after n clock pulses from the moment both outputs from B9 and B10 go "high", the original "high" level should be transferred to the $Q_n$ pin. Thus it will take n successive verification by detectors B9 and B10 to have all the Q pins of shift register B12 "high". This system can be used for re-validation of any possible −dV detection, the number of times depending on the number of outputs that the shift register can offer. Only when all Q pins or shift register B12 are "high" will output circuit B13 confirm the validity of the detection. It will output a "high" signal at output 62 to disable ultra-fast or fast charging at the external charger circuit Y2.

In the case of a false detection where the contents of the register B6 and B17 are not equal to the contents of the register B5, it is most likely that a value corresponding to the amplitude of a voltage "spike" has been stored in the register B5. When this situation arises the Q output of the −dV detector B9 will be "high" and the Q output of the level detector B10 will be "low". This will cause the output of an AND gate BB1 to go "high" because the AND gate BB1 has as one of its inputs the Q output of the −dV detector B9, and as its other input the Q output of the level detector B10 inverted through an inverter gate BB3. Hence through the OR gate BB2 the register B5 will be enabled regardless of the state of the peak detector B14. Therefore the contents of the register B3 will be clocked into the register B5, the false data in the register B5 will be clocked into the register B6, and the data in the register B6 will be clocked into the register B17. The next clock pulse or cycle will result in another false detection, as the false data is now in register B6, and result in the false data data being choked into register B17. Thus on the next clock pulse or cycle a further false detection will occur but the false data will be erased from register B17 and the circuit of FIG. 7 can resume further measurement. It can be seen that in the event of the Q outputs of the −dV comparator B9 and the level detector B10 being high the output of the AND gate BB1 is low and the peak detector B14 either enables or disables the register B5 though the OR gate BB2.

All readings in storage are updated during every battery voltage measurement in an ongoing process no matter whether there is any −dV detection or not. All measurements and re-checking are done without any interruption to charging and within a very short time frame (a few seconds) thus giving very quick response to the monitoring and avoiding overcharging, without any compromise to the accuracy. Also minimum filtering is needed, thus savings cost.

The −dV detection circuit described above with reference to FIG. 7 employs a detection method that makes use of the fact that the battery voltage changes very gradually, unlike switching noises which are in the range of hundreds of kHz. By maintaining measurements before the moment when −dV is suspected to occur, and also taking measurements after that moment, it is possible to filter out the switching noises and only act on genuine drops in voltage.

Figure 9A:
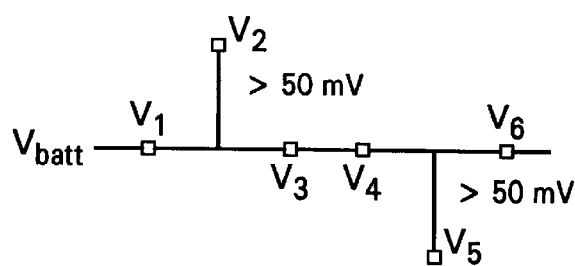
FIGS. 9a to 9b illustrate how the –dV detects and overcomes the problem of noise spikes.

Referring to FIG. 9a, if the amplitude at V3 is lower than that at V2 by more than the threshold (e.g. 50 mV), the reading at V1 is compared to that at V2. If amplitudes at V1 and V2 are not the same, then the detection is rejected as noise, as the voltage at V1 and V2 are not expected to differ due to the short time duration between measurement (typically one second interval).

If a voltage drop of more than 50 mV (−dV detection threshold) is detected from V4 to V5, the voltage at V6 is taken and compared to that at V4. If it is not consistent with the earlier voltage drop (from V4 to V5), the detection is ignored for the same reason.

Figure 9B:
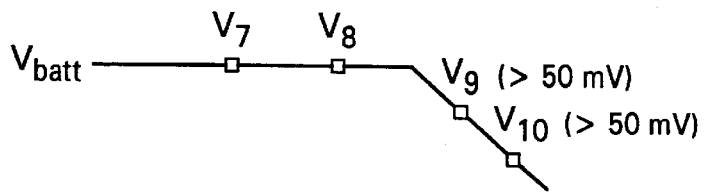

Only a genuine voltage drop of more than 50 mV like that shown in FIG. 9b (from V8 to V9) will be treated as a true −dV detection, as V7 and V8 have the same amplitude and V10 has a level which is more than 50 mV less than that at V8.

What is claimed is:

1. A battery charger, comprising:
   a voltage detector measuring a voltage of a battery being charged at a periodic interval;
   a voltage charging gradient detector determining a voltage charging gradient from each measured voltage and a last preceding measured voltage;
   a temperature detector measuring a temperature of the battery being charged at a periodic interval;
   a temperature gradient detector determining a temperature gradient from each measured temperature and a last preceding measured temperature; and
   a zero voltage gradient detector activated after at least one of the voltage charging gradient and the temperature gradient exceeds a respective threshold, the zero voltage gradient detector determining a completion of charge from a zero voltage charging gradient.

2. The battery charger of claim 1, further comprising:
   a voltage drop detector activated after at least one of the voltage charging gradient and the temperature gradient exceeds the respective threshold, the voltage drop detector determining a completion of charge from a voltage drop exceeding a voltage drop threshold.

3. The battery charger of claim 2, wherein the battery charger switches to a trickle charge mode after the completion of charge is determined.

4. The battery charger of claim 2, wherein the zero voltage gradient detector determines the completion of charge from detecting a zero voltage charging gradient after at least one of the voltage charging gradient and the temperature gradient exceeds the respective threshold.

5. The battery charger of claim 2, wherein the voltage drop detector determines the completion of charge from detecting a voltage drop exceeding the voltage drop threshold after at least one of the voltage charging gradient and the temperature gradient exceeds the respective threshold.

* * * * *

UNITED STATES PATENT AND TRADEMARK OFFICE
CERTIFICATE OF CORRECTION

PATENT NO. : 6,225,789 B1
DATED : May 1, 2001
INVENTOR(S) : Tang Kong Yuen

It is certified that error appears in the above-identified patent and that said Letters Patent is hereby corrected as shown below:

Column 1,
Line 39, delete "5" and replace with -- S --;

Column 3,
Line 47, insert -- and Q -- before "outputs";

Column 4,
Line 23, delete "voltages" and replace with -- voltage --;
Line 56, delete "the" and replace with -- an --;

Column 5,
Line 15, delete "." before "and" and delete "." before "respectively";
Line 36, delete "flat" and replace with -- flag --;
Line 39, delete "." before "or".
Line 57, delete "exceed" and replace with -- exceeds --;

Column 6,
Line 24, delete "." before "to" and delete "." before "as";

Column 7,
Line 46, delete "8bit" and replace with -- 8-bit --;

Column 9,
Line 25, delete "verification" and replace with -- verifications --.

Signed and Sealed this

Third Day of January, 2006

JON W. DUDAS
*Director of the United States Patent and Trademark Office*